United States Patent [19]

Amitay

[11] Patent Number: 5,371,780
[45] Date of Patent: Dec. 6, 1994

[54] COMMUNICATIONS RESOURCE ASSIGNMENT IN A WIRELESS TELECOMMUNICATIONS SYSTEM

[75] Inventor: Noach Amitay, Tinton Falls, N.J.
[73] Assignee: AT&T Corp., Murray Hill, N.J.
[21] Appl. No.: 98,758
[22] Filed: Jul. 28, 1993

Related U.S. Application Data

[63] Continuation of Ser. No. 786,616, Nov. 5, 1991, abandoned, which is a continuation-in-part of Ser. No. 591,321, Oct. 1, 1990, abandoned.

[51] Int. Cl.⁵ .............................................. H04Q 7/04
[52] U.S. Cl. .................................. 379/58; 340/825.02; 340/825.04; 340/825.08; 340/825.5; 370/54; 370/94.1; 370/110.1; 379/60; 455/34.1
[58] Field of Search ............... 340/825.04, 825.08, 340/825.5, 0825.51, 825.02; 370/85.1, 85.2, 85.3, 85.6, 94.1, 110.1, 54; 379/56, 58, 59, 60; 455/31.1, 33.1, 34.1, 56.1

[56] References Cited

U.S. PATENT DOCUMENTS

| | | | |
|---|---|---|---|
| 3,764,915 | 10/1973 | Cox et al. ................................. | 325/53 |
| 4,112,257 | 9/1978 | Frost ......................................... | 179/2 |
| 4,125,808 | 11/1978 | Graham .................................... | 325/55 |
| 4,144,411 | 3/1979 | Frenkiel .................................... | 179/2 |
| 4,221,115 | 9/1980 | Cooper et al. ........................... | 375/1 |
| 4,284,848 | 8/1981 | Frost ......................................... | 179/2 |
| 4,301,539 | 11/1981 | Kage ......................................... | 375/107 |
| 4,383,332 | 5/1983 | Glance et al. ........................... | 455/33 |
| 4,485,486 | 11/1984 | Webb et al. ............................. | 455/33 |
| 4,613,990 | 9/1986 | Halpern .................................... | 455/33 |
| 4,686,671 | 8/1987 | Burian et al. ............................ | 370/88 |
| 4,698,839 | 10/1987 | De Vare et al. ........................ | 379/60 |
| 4,710,904 | 10/1987 | Darcie ....................................... | 370/3 |
| 4,716,407 | 12/1987 | Borras et al. ............................ | 340/825.04 |
| 4,718,081 | 1/1988 | Brenig ....................................... | 379/60 |
| 4,726,644 | 2/1988 | Mathis ...................................... | 350/96.16 |

(List continued on next page.)

FOREIGN PATENT DOCUMENTS 0012627 of 0000 Japan .
0029221 of 0000 Japan .
0101135 of 0000 Japan .
0203025 of 0000 Japan .

OTHER PUBLICATIONS

Chadha, Hunnicutt, Peck and Tebes, "Mobile Telephone Switching Office," *The Bell System Technical Journal*, Jan. 1979.

(List continued on next page.)

*Primary Examiner*—Curtis Kuntz
*Assistant Examiner*—William Cumming
*Attorney, Agent, or Firm*—Eugene S. Indyk

[57] ABSTRACT

Fast resource assignments, especially needed in microcellular network architectures having many fast moving subscribers and high traffic volume, is provided through the use of a priority based resource assignment apparatus and procedure. Part of the communications resources in a cellular network, for example, one carrier frequency and/or one time slot, or particular code division multiple access sequences are dedicated to the execution of the assignment procedure. Available communications resources are auctioned to cellular subscribers contending for resources based upon a level of priority assigned to each contending subscriber. The priority level may be based on such things as the quality of service to which a customer subscribes or the particular needs of a subscriber at the time the subscriber is contending for resources, for example, the subscriber's request for resources may be prompted by a need to make a handoff. The procedure involves an auction period when a determination is made regarding which of a group of contending subscribers has the highest priority level. The procedure then enters a resource assignment period where an available communications resource is actually assigned to the subscriber having the highest priority level. The auction and assignment periods are then repeated for the remaining contending subscribers until there are no longer any contending subscribers or there are no longer any available resources. Fast resource assignment could be used to increase system capacity and efficiency of spectrum utilization through the ability to perform speech activity resource sharing.

24 Claims, 6 Drawing Sheets

U.S. PATENT DOCUMENTS

| | | | |
|---|---|---|---|
| 4,727,590 | 2/1988 | Kawano et al. | 455/33 |
| 4,759,051 | 7/1988 | Han | 379/59 |
| 4,771,448 | 9/1988 | Koohgoli et al. | 379/60 |
| 4,829,554 | 5/1989 | Barnes et al. | 379/58 |
| 4,864,310 | 9/1989 | Bernard et al. | 342/368 |
| 4,866,431 | 9/1989 | Andros et al. | 340/825.02 |
| 4,881,271 | 11/1989 | Yamauchi et al. | 455/56 |
| 4,887,265 | 12/1989 | Felix | 370/94.1 |
| 4,901,340 | 2/1990 | Parker et al. | 379/60 |
| 4,916,460 | 4/1990 | Powell | 343/853 |
| 4,916,691 | 4/1990 | Goodman | 370/60 |
| 4,916,728 | 4/1990 | Blair | 379/59 |
| 4,972,456 | 11/1990 | Kaczmarek et al. | 379/59 |
| 4,977,589 | 12/1990 | Johnson et al. | 379/58 |
| 5,022,024 | 6/1991 | Paneth et al. | 370/50 |
| 5,036,531 | 7/1991 | Spear | 379/58 |
| 5,040,177 | 8/1991 | Martin et al. | 370/110.1 |
| 5,067,147 | 11/1991 | Lee | 379/60 |
| 5,128,959 | 7/1991 | Bruckert | 375/1 |
| 5,132,680 | 7/1992 | Tezuka et al. | 340/825.08 |
| 5,142,682 | 8/1992 | Lemay et al. | 340/825.5 |
| 5,245,603 | 9/1993 | Newman | 370/54 |
| 5,249,304 | 9/1993 | Mulford | 455/34.1 |

OTHER PUBLICATIONS

Jeffery, "An Automatic Radio Telephone System," *Conference on Land Mobile Radio*, Bailrigg, Lancaster, England, U.K., Sep. 1979.

Ballard, Issenmann and Sanchez, "Cellular Mobile Radio as an Intelligent Network Application," *Elec. Comm.*, Oct. 1989.

D. J. Goodman, "Cellular Packet Communications," *IEEE Trans. on Comm.*, vol. 38, No. 8, Aug. 1990, pp. 1272-1280.

R. Steele, "The Cellular Environment of Lightweight Handheld Portables," *IEEE Comm. Magazine*, vol. 27, No. 7, Jul. 1989, pp. 20-29.

R. Steele et al, "High-User-Density Digital Cellular . . . ", *IEE Proceedings*, vol. 132, Pt. F., No. 5, Aug. 1985, pp. 396-404.

R. Steele et al., "Towards a High-Capacity Digital Cellular Mobile Radio System", *IEEE Proceedings*, vol. 132, No. 5, Aug. 1985, pp. 405-415.

D. McKay, "Moving RF Over Fiber Optics", *Communications Magazine of Mobile Radio Professionals*, Oct. 1988, pp. 30-36.

Ikeda, Akiyama and Hoshida, "Land Mobile Telephone Switching Equipment," *Review of the ECL*, Nov. 1977.

Chesson, G. L., "Datakit Software Architecture," 1979 Int'l Conf. on Comm., Part II, Jun. 10-14, 1979, pp. 20.2.1-2.5.

Chesson, G. L. et al., "Datakit Network Architecture," COMPCON Spring 1980, VLSI: New Architectural Horizons, Feb. 25-28, 1980, pp. 59-61.

Chu, W. W. et al., "Experimental Results On The Packet Satellite Network," NTC Conf. Rec. Nat'l Telecommun. Conference, Nov. 27-29, 1979, pp.45.4.1-4.12.

Fraser, A. G., "Datakit-A Modular Network For Synchronous And Asynchronous Traffic," 1979 Int'l Conferece on Communications Part II, Jun. 10-14, 1979, pp. 20.1.1-1.3.

Goodman, D. J. et al., "Packet Reservation Multiple Access For Local Wireless Communications," IEEE Transactions On Communications, vol. 37, No. 8, Aug. 1989, pp. 885-890.

Goodman, D. J., "The Near/Far Effect of Local ALOHA Radio Communications," IEEE Trans. on Vehicular Tech., vol. VT-36, No. 1, Feb. 1987, pp. 19-27.

Kahn, R. E., "The Introduction of Packet Satellite Comm.," Advanced Research Projects Agency, pp. 45.1.1-1.8.

Rammamurthi, B. et al., "Perfect Capture ALOHA for Local Radio Comm.," IEEE Jour. on Selected Areas in Communications, vol. SAC-5, No. 5, Jun. 1987, pp. 806-814.

Jacobs, I. M. et al., "Packet Satellite Network Design Issues," NTC Conf. Rec. Nat'l. Telecommun. Conf., Nov. 27-29, 1979, pp. 45.2.1-2.12.

Jacobs, I. M. et al., "General Purpose Packet Satellite Networks," Proc. of The IEEE, vol. 66, No. 11, Nov. 1978, pp. 1448-1467.

Tanenbaum, A. A., "Computer Networks," New Jersey: Prentice Hall, Inc., 1981, pp. 249-285.

Kleinrock, L., "Queuing Systems," New York: John Wiley & Sons, 1976, pp. 360-393.

"Datakit$^R$ II VCS System Description," AT&T, Issue 1, Copyright 1989, pp. 1.1-3.45.

Taub + Schilling, "Principles of Communication Systems" 1986, pp. 282-286.

COMMUNICATIONS RESOURCE ASSIGNMENT IN A WIRELESS TELECOMMUNICATIONS SYSTEM

CROSS REFERENCE TO RELATED APPLICATIONS

This application is a continuation of application Ser. No. 07/787,616, filed Nov. 5, 1991, now abandoned, which is a continuation-in-part of application Ser. No. 07/591,321, filed Oct. 1, 1990, now abandoned.

FIELD OF THE INVENTION

This invention relates to wireless telecommunications systems. More particularly, this invention relates to fast communications resource assignments in wireless telecommunications systems.

BACKGROUND OF THE INVENTION

Wireless telecommunications is a rapidly expanding part of the telecommunications industry. For example, there is a rapidly increasing demand for, and an increasing number of subscribers to, the services of the so-called cellular telecommunication networks by which those cellular subscribers can call other parties via radio communications links to the cellular networks. Cellular subscribers can not only call other cellular subscribers but they can also be given access to conventional public switched telephone networks for making telephone calls to other parties subscribing to the telephone services provided by those telephone networks. There is no need for a physical connection between the cellular subscriber and the party being called. Telephone calls involving moving parties—for example, those traveling in automobiles and other forms of transport—thus are made possible by cellular telecommunications networks and systems.

Cellular telecommunications networks comprise a plurality of base stations for communicating via radio with cellular subscribers located in predetermined geographical areas served by the base stations. The geographical area served by a base station is called a cell. Each base station communicates with subscribers located in its cell via one of a number of communications resources, which, in a frequency division multiple access (FDMA) arrangement, may be one of a number of carrier frequencies modulated by a cellular subscriber and the base station. A plurality of subscribers may be able to use the same carrier frequency in a time division multiplex arrangement, known as time division multiplex access (TDMA), whereby subscribers are assigned certain time slots during which they transmit and receive on the assigned carrier frequencies. Yet another method by which subscribers may communicate by radio with base stations involves spread spectrum code division multiple access (CDMA) techniques. Combinations of these methods may also be used. In response to requests from subscribers, the base stations assign one communications resource, for example, a frequency and/or time slot, or a CDMA sequence, not currently being used to each requesting subscriber. The assigned communications resource then is used by the cellular subscriber to communicate with the base station and with a called party.

Requests for assignment of communications resources in a cellular telecommunications network can occur in a variety of ways. For example, a request for assignment of resources can result from a cellular subscriber initiating a telephone call to another party or responding to a telephone call which has made to the cellular subscriber. A particularly important occurrence requiring a communications resource assignment is a handoff of a mobile cellular subscriber already engaged in an ongoing telephone call from one base station to another base station due to movement of the subscriber from one cell to another cell.

As the number of subscribers to cellular telecommunications services has increased, a trend which is already dramatically evident and is expected to continue in the future, it has become increasingly difficult to provide adequate service for normal voice transmission, much less for other services such as data transmission. This is due to the fact that there are only a finite number of communications resources for which an increasing number of subscribers must contend. To alleviate the problem of availability of a limited number of communications resources, it has been proposed to divide existing cells into smaller cells, called microcells, and to increase the amount of frequency reuse in nonadjacent cells and microcells, thus accommodating a greater number of subscribers with the same number of communications resources. As the number of subscribers increases in any given cellular telecommunications network, however, there will be an increasing number of resource assignments which must be made and, therefore, there will be an increasing need to make fast resource assignments in that network. More importantly, in the case of dense microcellular network environments, where the geographical areas served by each transmitter and receiver becomes smaller, shorter movements of a mobile cellular subscriber connected to the network need even faster resource assignments because frequent handoff operations are required.

In addition to addressing the need to utilize a limited number of communications resources to meet the needs of increasing number of subscribers in dense microcellular environments, it also would be advantageous to more efficiently use the limited communications spectrum allotted to the cellular network. In specific terms, it would be particularly advantageous if silent periods between talk spurts during voice transmissions of one subscriber could be used by another subscriber for a voice transmission or could be used for some other purpose such as facsimile or data transmission. In this regard, techniques such as voice activated resource sharing have been proposed, but these cannot now be used because resource assignments are not fast enough in current cellular networks. Finally, it would be advantageous to provide different levels of service for at least some cellular subscribers.

Currently, some of the commonly used techniques for communications resource assignment in radio based telecommunications are statistical in nature. Among these are techniques known as ALOHA, slotted ALOHA, and packet reservation multiple access (PRMA). Resource utilization and throughput are unsatisfactory with such techniques because of collisions between competing subscribers, particularly under heavy traffic conditions which are expected in microcellular environments. Collisions result in none of the contending subscribers obtaining service which thereby wastes communications resources and increases the amount of time it takes for a subscriber to obtain a communications resource assignment, which seriously hinders handoff operations, especially in microcellular environments. Techniques such as voice activated resource sharing clearly cannot be used with current resource assignment techniques used in existing cellular networks and thus available resources cannot be used as efficiently as they might be used if resource assignments could be made more rapidly.

Accordingly, there is a need for a communications resource assignment technique which is rapid enough to adequately serve a large number of fast moving cellular subscribers densely positioned in a region served by a wireless telecommunications network. In addition, there is a need to efficiently utilize the limited communication resources available in a wireless telecommunications network.

SUMMARY OF THE INVENTION

The needs described above are met by an apparatus which quickly assigns communications resources in a wireless telecommunications network by executing a procedure whereby available resources are provided to subscribers according to service or other prescribed priorities. The assignment apparatus comprises a means for identifying one of a plurality of prioritized subscribers contending for service on the wireless telecommunications network with the highest priority. In preferred embodiments of the invention, an auction procedure is used. An available communication resource is assigned to the identified subscriber in a short period of time regardless of traffic volume and without collisions. The time it takes to accomplish a communications resource assignment is drastically reduced so that the amount of time it takes to access the network is reduced, handoffs are made more quickly, and resource sharing techniques may be used.

DETAILED DESCRIPTION

Figure 1:
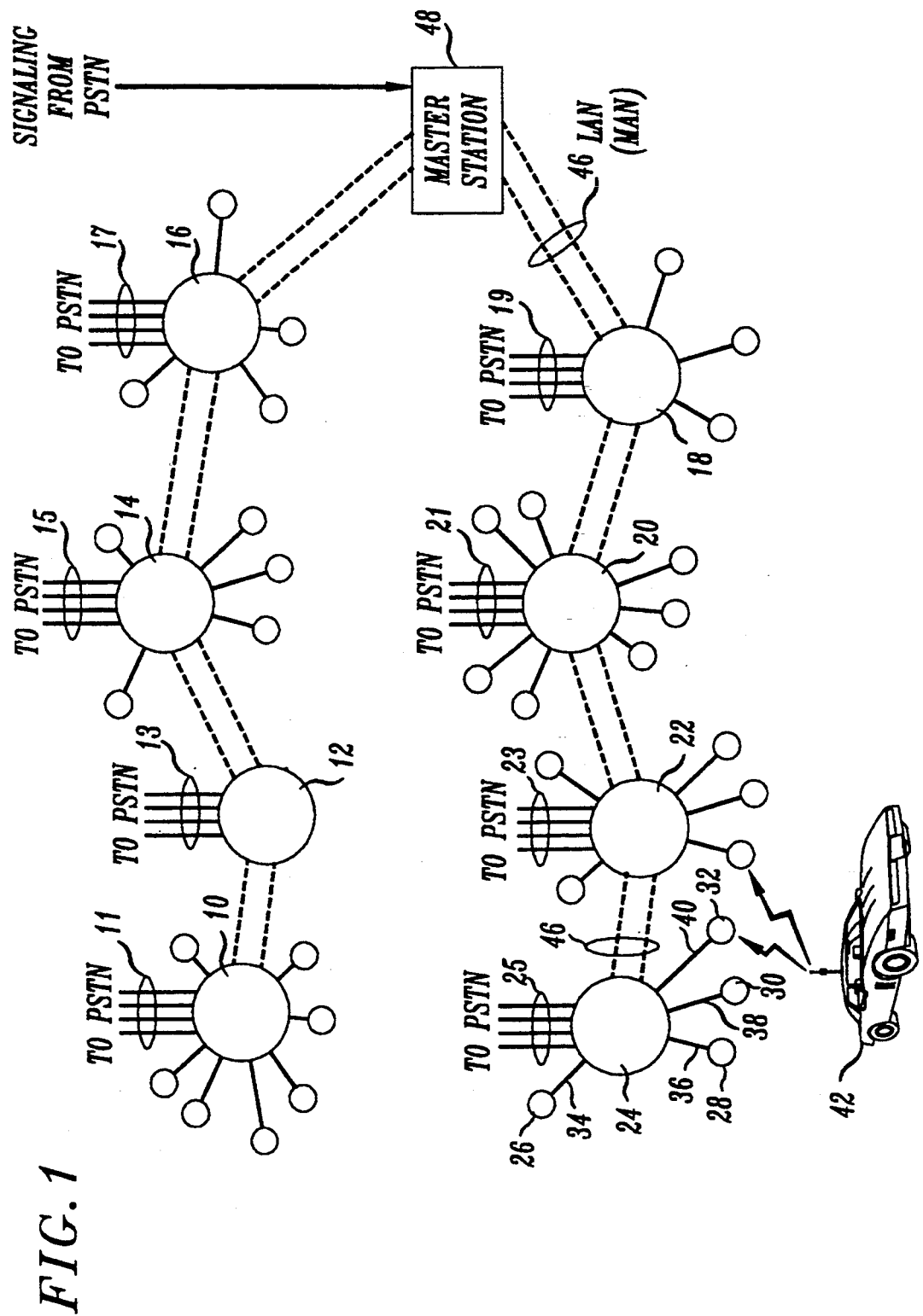
FIG. 1 is an example of a wireless telecommunications network architecture in accordance with the invention.
Figure 2:
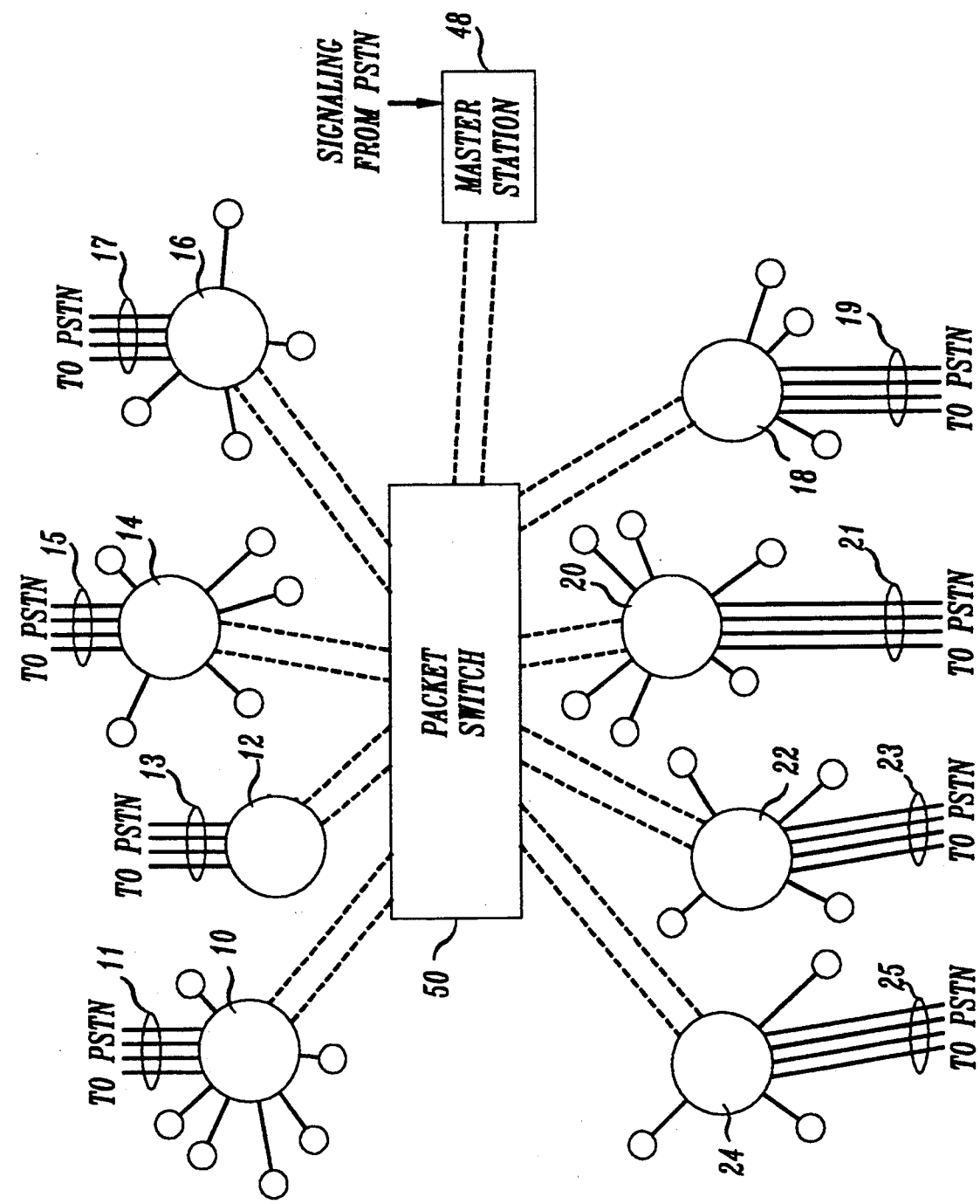
FIG. 2 is an example of another wireless telecommunications network architecture in accordance with the invention.

FIGS. 1 and 2 illustrate examples of wireless telecommunication network architectures which may be used advantageously with the invention of this application. In those networks shown in FIGS. 1 and 2, all calls are digitized and packetized. The networks comprise a plurality of base stations, each base station serving a predetermined geographical area called a cell which, in turn, is divided into a number of microcells. There is at least one microsite in each microcell containing one or more radio transmitters and receivers for communicating by radio with cellular subscribers located within the confines of the microcell. The microsites in the microcells may comprise fixed cannisters mounted on lamp posts, utility poles, or the like which may serve a variety of subscribers on lineal segments of a roadway or in a small area of a city. Telephone calls handled by the microsites are channeled to their respective base stations through any convenient transmission medium, such as optical fibers, millimeter waves, a twisted pair of metallic wires, or other means. The calls are trunked directly from the base stations to exchange offices in the public switched telephone network where the calls are then switched to their ultimate destinations.

In the architectures of FIGS. 1 and 2, calls from stationary cellular subscribers are trunked directly from a base station to the closest or otherwise most convenient exchange office in the public switched telephone network. Calls of mobile subscribers are routed for the duration of the call to the base station where the call was initially established via a metropolitan or local area network (FIG. 1) or a packet switch (FIG. 2). From that initial base station, the calls are trunked into the most convenient public switched telephone network exchange office. Thus, for the duration of the mobile subscriber's call, the trunk circuit connecting the base station where the call was initially established to the public switched telephone network is not interrupted.

In microcellular architectures such as those shown in FIGS. 1 and 2, increased frequency reuse will be needed to accommodate growth in communications traffic. This will increase the number of microcells and correspondingly reduce in the dimensions of each microcell. Moving subscribers will, therefore, traverse an increasing number of smaller dimension microcells during a call which will result in a greater number of handoffs in a given period of time. In order to increase the efficiency of spectrum utilization, it would be advantageous for certain features such as speech activity controlled resource sharing to be incorporated into the architectures of FIGS. 1 and 2. This will require that communications resources be relinquished at the conclusion of talk spurts and those resources will have to be successfully reapplied for and successfully attained prior to the next talk spurt. This points to an urgent need for fast and flexible access to the cellular network as well as rapid handoff and resource assignment. The aspects of FIGS. 1 and 2 pertinent to this invention are described in more detail below.

FIG. 1 shows a wireless telecommunications network architecture comprising a plurality of base stations 10, 12, 14, 16, 18, 20, 22, and 24. Each of those base stations is located in a predetermined geographical area commonly referred to as a cell. Each of the base stations in this architecture serves to directly connect stationary or mobile cellular subscribers located in its cell to the public switched telephone network via suitable transmission lines 11, 13, 15, 17, 19, 21, 23, and 25, so that a telephone call may be made between cellular subscribers and other parties. The transmission lines 11, 13, 15, 17, 19, 21, 23, and 25 may be any convenient means of connecting the base stations 10, 12, 14, 16, 18, 20, 22, and 24 to a public switched telephone network, such as T-carrier transmission lines, subscriber loop carrier (SLC) lines, optical fibers, or millimeter waves.

Each cell served by a base station is further divided into a number of smaller geographical areas called microcells. A microsite in each microcell contains radio receivers and transmitters which directly communicate via radio with each subscriber to the cellular network located in its respective microcell. Radio receivers and transmitters of each microcell are contained in a suitable cannister which is connected to its respective base station via a convenient means of transmission, such as a metallic twisted pair, an optical transmission line, millimeter waves, and the like. For example, in FIG. 1, base station 24 is connected to a number of cannisters 26, 28, 30, and 32 via transmission lines 34, 36, 38, and 40.

Subscribers to the cellular network, such as a mobile subscriber 42 in FIG. 1, communicate by radio with an appropriate cannister, for example, with a cannister 32, when the subscriber 42 is located in a convenient location with respect to that cannister 32. This is usually when the mobile subscriber is located in the microcell containing cannister 32 where the radio signals received from cannister 32 are normally stronger than the radio signals received from any other cannister.

When the mobile subscriber 42 moves to another microcell within the cell served by base station 24, the subscriber 42 must be handed off to the new cannister serving the microcell to which the subscriber 42 has moved. This handoff operation involves a request from the subscriber 42 to the new cannister for assignment of a new communications resource which then can be used by the subscriber 42 to continue the phone call through the new cannister. The handoff operation also involves relinquishment of the communication resource which was being used prior to the handoff.

Phone calls are initiated by cellular subscribers requesting the assignment of a communications resource, for example, assignment of a time slot on a carrier frequency which not currently being used. The phone of the cellular subscriber identifies the cannister closest to cellular subscriber and a request for assignment of a resource is sent to that cannister and passed on to its associated base station. The base station, which controls a number of microsite cannisters, maintains in a memory a list of occupied and available communications resources, which may be time division multiple access (TDMA) time slots or frequency division multiple access (FDMA) frequencies, or a combination of both. Other forms of communications resources may also be used depending on the nature of the wireless telecommunications system. For example, code division multiple access (CDMA) type resources may also be used. After the request from the cellular subscriber is received, a search then is made in the base station connected to the cannister to which request was made to see if any resources are available and, if an available resource is found, it is assigned to the subscriber 42, which then begins to transmit and receive electrical signals comprising the phone call using the assigned resource. The communication resource assigned for the uplink portion of the call may be the same as the communications resource assigned for the downlink portion of the call, or they may be different. The phone call is directed through the cannister selected by the subscriber phone and over the transmission medium by which the cannister is connected to its associated base station. The base station directs the phone call to the public switched telephone network via its associated transmission lines which directly connect the base station to the public switched telephone network. The call is then switched by the public switched telephone network to the called party, who may be a party who is or is not a subscriber to the cellular network shown in FIG. 1.

In FIG. 1, the cellular subscriber 42 may initiate a phone call by first determining the optimal microcell cannister which will best provide entry for the subscriber into the cellular network. For this purpose, each cannister in FIG. 1 transmits a unique network identification. This identification may consist of a cannister number, a base station identification, and a packet switch/LAN (MAN) identification. This information is carried in the headers of the voice or data packets transmitted between the subscriber and the cannister. In addition, each cannister also transmits the identification of the resources (RF carriers, time slots, CDMA sequences, etc.) involved in the assignment/handoff procedure described below. The subscriber's handset monitors the cannisters in its proximity. It identifies the cannisters and their relative field strengths, bit error rates (BER), or other parameters, which serve as an input to the access and handoff decisions. Some other form of diversity, such as spatial or frequency diversity, maybe incorporated into the subscriber's handset to increase the reliability of communications.

For example, the subscriber's telephone equipment may determine that cannister 32 connected to base station 24 is the optimal entry point into the cellular network in light of the position of the subscriber 42 shown in FIG. 1. This determination can be based upon the strength of a signal broadcast by the cannister 32 or other criteria.

Once the telephone equipment of the cellular subscriber 42 has selected an appropriate cannister with which to communicate, the cellular subscriber's telephone then makes a request for a communications resource. The base station 24 connected to the selected cannister 32 then performs a communications resource assignment procedure in response to the request from the cellular subscriber 42. As a result of this procedure, the base station 24 searches for unused communications resources and when such resources are found, the base station 24 in this example assigns a particular time slot and carrier frequency, or other type of resources, which will be used by the subscriber to make a telephone call to another party. The subscriber's telephone equipment is then notified of the carrier frequency and time slot, or other resource, through a transmission from cannister 32. The cannister 32 and its associated base station 24 then complete a circuit to the public switched telephone network via an appropriate one of the transmission lines 25. The phone call is then completed to the called party through the public switched telephone network in the usual manner.

When the cellular subscriber 42 moves outside the microcell associated with cannister 32, or for some other reason it becomes advantageous to communicate with a different cannister associated with the base station 24, a handoff procedure must be carried out. This handoff procedure involves another request for assignment of communications resources available from the new cannister, which is made and answered in a manner similar to the way that the original request made at call initiation was handled, as described above. When a new communications resource has been assigned by the new cannister, the call continues using the new communications resource through the new cannister, base station 24, and the same circuits in the transmission lines 25 and the public switched telephone network. The resource used prior to the handoff is relinquished.

If the cellular subscriber 42 were to move to a microcell which is associated with a different base station, for example, if the cellular subscriber 42 were to move so that it became more advantageous for the cellular subscriber 42 to communicate with cannister 44 associated with base station 22, then there must be a handoff procedure involving both the new cannister 44 and the new base station 22. As before, the subscriber 42 in this situation will request assignment of a new communications resource from cannister 44. The base station 22 will then engage in an assignment procedure similar to the one described above for base station 24 and cannister 32. A search is made by the base station 22 for unused communications resources which might be assigned to the requesting subscriber 42. When an unused resource has been identified, it is assigned to cellular subscriber 42 and the cellular subscriber 42 then begins to communicate with cannister 44 using the assigned resource. The communications resource used to communicate with cannister 32 is relinquished. Signals received by the cannister 44 from subscriber 42 are directed to the base station 22 which then forwards those signals over a local area network or a metropolitan area network 46 to the base station from which the call was originally directed into the public switched telephone network. Specifically, in the instance described here, the base station 22 forwards signals received at cannister 44 to base station 24, where the call was initiated and where connection was first made to the public switched telephone network. The call continues to be trunked to the public switched telephone network via the same circuit originally set up on transmission lines 25 by the base station 24 when the call was initiated.

If the subscriber 42 were to continue to move to other microcells involving the same or different base stations, the connection of the subscriber to the public switched telephone network would always be maintained through the base station 24 where the call was initiated and through the transmission lines 25 connecting that base station 24 directly to the public switched telephone network. When there is a handoff to a new base station, that new base station will forward signals from the cellular subscriber 42 to the base station 24 where the call originated over the local or metropolitan area network 46.

When a party attempts to make a telephone call to the cellular subscriber 42, the signalling portion of the public switched telephone network notifies a master station 48 which then initiates a polling procedure performed by the base stations in the cellular network for locating the cellular subscriber which the party is attempting to call. When the cellular subscriber has been located, that is, when the cannister and base station, for example, cannister 32 and base station 24, serving the subscriber's current location have been identified, the cellular subscriber, such as cellular subscriber 42 in FIG. 1, requests assignment of an available communications resource from that base station via radio signals directed to the associated cannister as described above in the case of the cellular subscriber initiating the phone call. The assignment procedure described above is undertaken by the base station and an available resource is assigned. The subscriber will then communicate with the cannister using the assigned resource. When the called subscriber 42 has been located by the polling operation initiated by master station 48, the master station 48 is notified by the base station 24. The master station 48 notifies the signalling portion of the public switched telephone network to route the call through the exchange office serving base station 24. A connection for the call is made between the base station 24 and the public switched telephone network via the transmission lines 25 directly connecting base station 24 to the public switched telephone network. This will connect the calling party to the cellular subscriber through the base station 24 where the cellular subscriber is located at the beginning of the phone call. The call between the calling party and the cellular subscriber thus takes place through the cannister closest to the subscriber, the base station connected to that cannister, the transmission lines directly connecting that base station to the public switched telephone network, and the routing in the public network which has been just set up. Movement of the cellular subscriber 42 causes the handoffs between cannisters and base stations along with requests for, and assignments of, unused and available communications resources, which will be used to continue the phone call from the new locations. Further details about the operation of the architecture of FIG. 1 with respect to accessing the cellular and public switched networks, and accessing cellular subscribers, are given in the parent application mentioned above, such details being incorporated by reference into this application in their entirety.

FIG. 2 is another example of a cellular network architecture which is useful in carrying out this invention. The architecture of FIG. 2 is similar to that of FIG. 1 except that instead of a local area network or a metropolitan area network 46 interconnecting the base stations, a packet switch 50 is used to interconnect the base stations as indicated by the dotted lines in FIG. 2. The forwarding of signals received by various base stations in the architecture of FIG. 2 to base stations which had originated a phone call to or from a cellular subscriber to or from the public switched telephone network and another party is done via the packet switch 50 rather than through a local area network or a metropolitan area network as shown in FIG. 1. The operation of the architecture of FIG. 2 is otherwise the same and a description of such is not repeated here.

Figure 6:
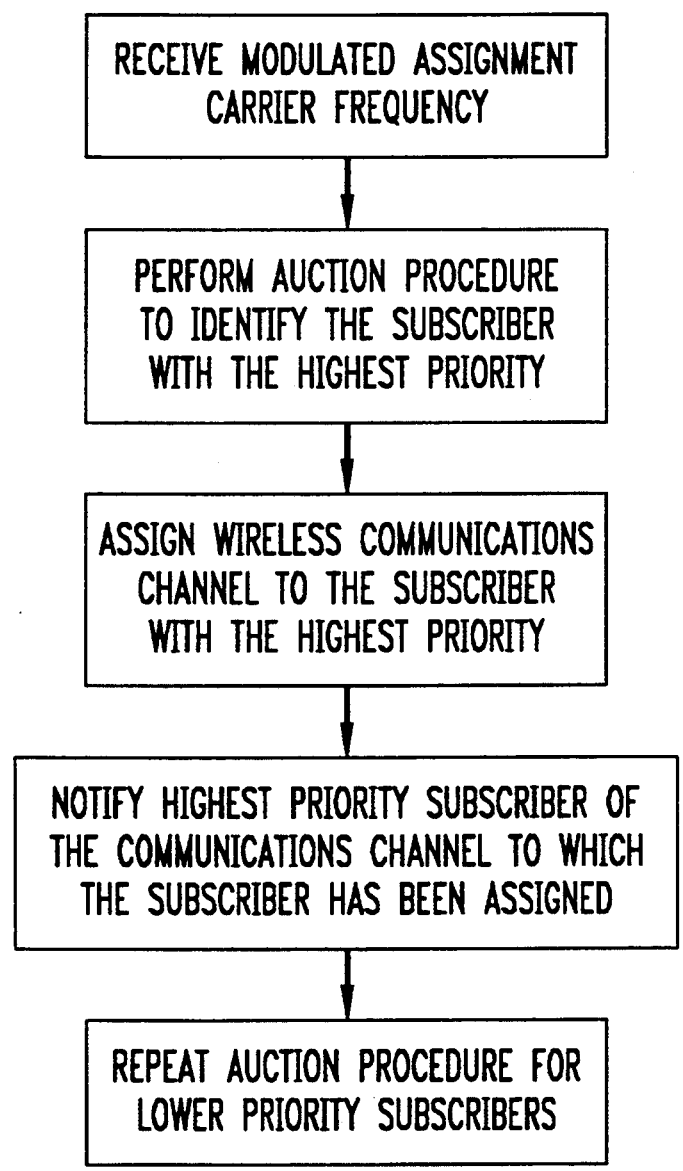
FIG. 6 is a flow chart representing an example of a communications resource assignment procedure in accordance with this invention.

In any cellular architecture with significant amounts of communication traffic, particularly in microcellular architectures such as the ones shown in FIGS. 1 and 2, it is important that available communications resources be assigned to requesting subscribers as rapidly as possible. It is especially important where there are many fast moving mobile subscribers to a network having small size microcells and in situations where there are more than one subscriber contending for assignment of available resources at the same time. Accordingly, the networks shown in FIGS. 1 and 2 perform a communications resource assignment procedure shown in FIG. 3 which permits cellular subscribers to access the cellular network or successfully accomplish handoff procedures in a short period of time. See also FIG. 6 which is a flow chart of a communications resource assignment procedure in accordance with this invention.

Figure 3:
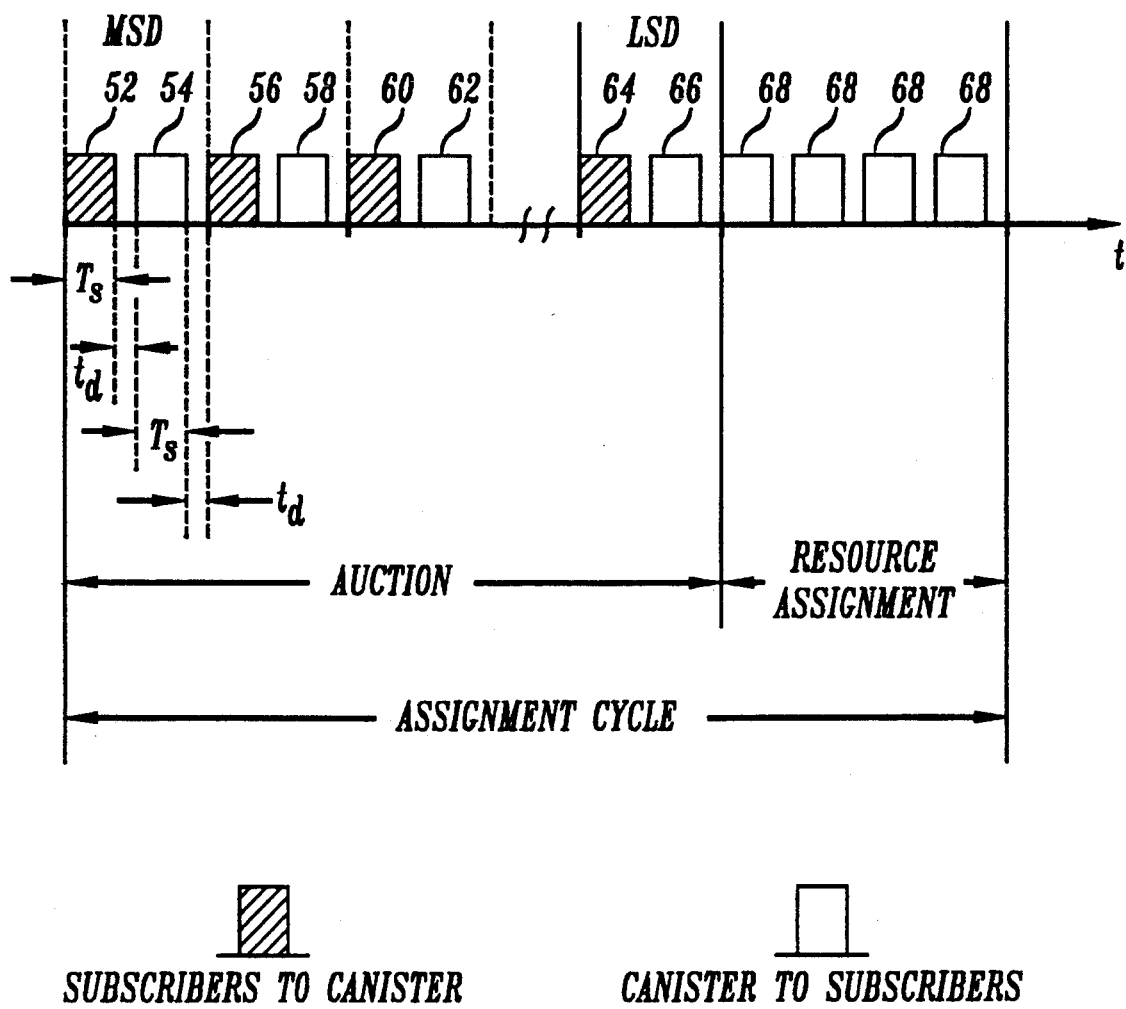
FIG. 3 illustrates the assignment of communications resources by the network architectures of FIGS. 1 and 2.

The assignment procedure of FIG. 3 requires that the telephone equipment of each subscriber to the cellular network be assigned a unique identification code. That code may comprise a priority designation and a unique identification number, such as a social security number. The priority designation may signify the quality of service to which the customer subscribes. The priority designation may also signify some particular current need of a subscriber requesting access to the cellular network. For example, the priority designation may be such that the cellular subscriber is requesting a communications resource assignment because a handoff operation is indicated due to movement of the subscriber from one area to another. Also, if a subscriber has been waiting for a long time for a resource, that subscriber's priority may be upgraded after a while. Those subscribers having the highest priority will be given the first communications resource assignments in situations where more than one subscriber is asking for such assignment at the same time.

The identification code assigned to each cellular subscriber is a multidigit or multibit code which is sent to a selected cannister at a predetermined time designated by the base station associated with the selected cannister. The identification code is used by the base station to perform a procedure involving an assignment cycle composed of an auction period during which one of a plurality of contending subscribers having the highest priority level is identified and a resource assignment period during which the identified highest level priority subscriber is assigned an available resource and is notified of the nature of the communications resource which has been assigned by the base station. Each subscriber contending for a communications resource assignment first transmits to the cannister at a predetermined time set by the base station the most significant digit or bit of its identification code as indicated by the shaded block 52 in FIG. 3. As indicated in FIG. 3, the duration of the transmission of that digit is $T_s$. In FIG. 3, the longest possible propagation delay time between the subscribers and the cannister is $t_d$ which is the period of time between the end of the furthest possible subscriber's transmission of the most significant digit of its identification code and the beginning of a response from the cannister. The base station contains a processing circuit which determines what is the highest of the most significant digits received from contending subscribers. The cannister is instructed by the base station to transmit an indication of the highest value most significant digit which it just received from the contending subscribers as shown by block 54 in FIG. 3. Any contending subscribers which transmitted a most significant digit less than the highest value most significant digit sent to the cannister in block 54 are inhibited from further participation in this part of the assignment procedure. Those contending subscribers which transmitted a most significant digit having a value equal to the highest value received by the cannister in block 52, remain in contention for an available resource. The remaining contending subscribers then transmit to the cannister their next most significant digits of their identification codes in block 56. The base station then ascertains what was the highest of the next most significant digits and transmits an indication of such determination to the remaining contending subscribers in block 58. Again, those contending subscribers which transmitted a next most significant digit equal to the indication sent by the base station via a cannister to the subscribers in block 58 are permitted to continue in the contention procedure and the others are inhibited or drop out as before. This procedure is continued for all of the remaining digits in descending significance, as indicated by blocks 60, 62, 64, and 66, until there is only one remaining subscriber requesting a communications resource. The base station then assigns an available communications resource, for example, a time slot on a selected carrier frequency, to the winning subscriber during the resource assignment period indicated in FIG. 3. As indicated by blocks 68 in the resource assignment period shown in FIG. 3, the base station and cannister send a multidigit designation to the winning subscriber notifying that subscriber of the identification of this resource, for example, the time slot and carrier frequency which has been assigned to the subscriber. The telephone equipment of the subscriber then adjusts itself so that it communicates with the cannister in the assigned time slot on the assigned carrier frequency.

The next unused and available communications resource is then auctioned to the other contending subscribers which lost out to the winning subscriber described above and to any new contending subscribers which arrived during the previous assignment cycle. The auction procedure is again undertaken during another auction period to identify the highest level priority subscriber remaining in contention and when that subscriber is identified, it is assigned the next available communications resource during another resource assignment period. Assignment cycles comprising an auction period and a resource assignment period are repeated until either there are no longer any more contending subscribers or there are no longer any unused and available communications resources. The assignment procedure of FIG. 3 may be used to assign resources for both the uplink from the subscriber to a base station and the downlink from a base station to the subscriber.

This resource assignment procedure allows quick handoffs of mobile subscribers which have an already established telephone connection as well as an advantageous general access method for establishing and maintaining multipriority service. It is noteworthy that all available communications resources, in this case, available slots on particular frequency carriers, could always be assigned without deleterious collisions irrespective of the level of traffic volume. This is in contrast to statistical methods of accessing cellular telecommunications networks such as ALOHA and packet reservation techniques where collisions between transmissions sent from contending subscribers can thereby cause none of the subscribers to successfully gain access to the network and can thereby cause successful entry, to be substantially delayed.

Figure 4:
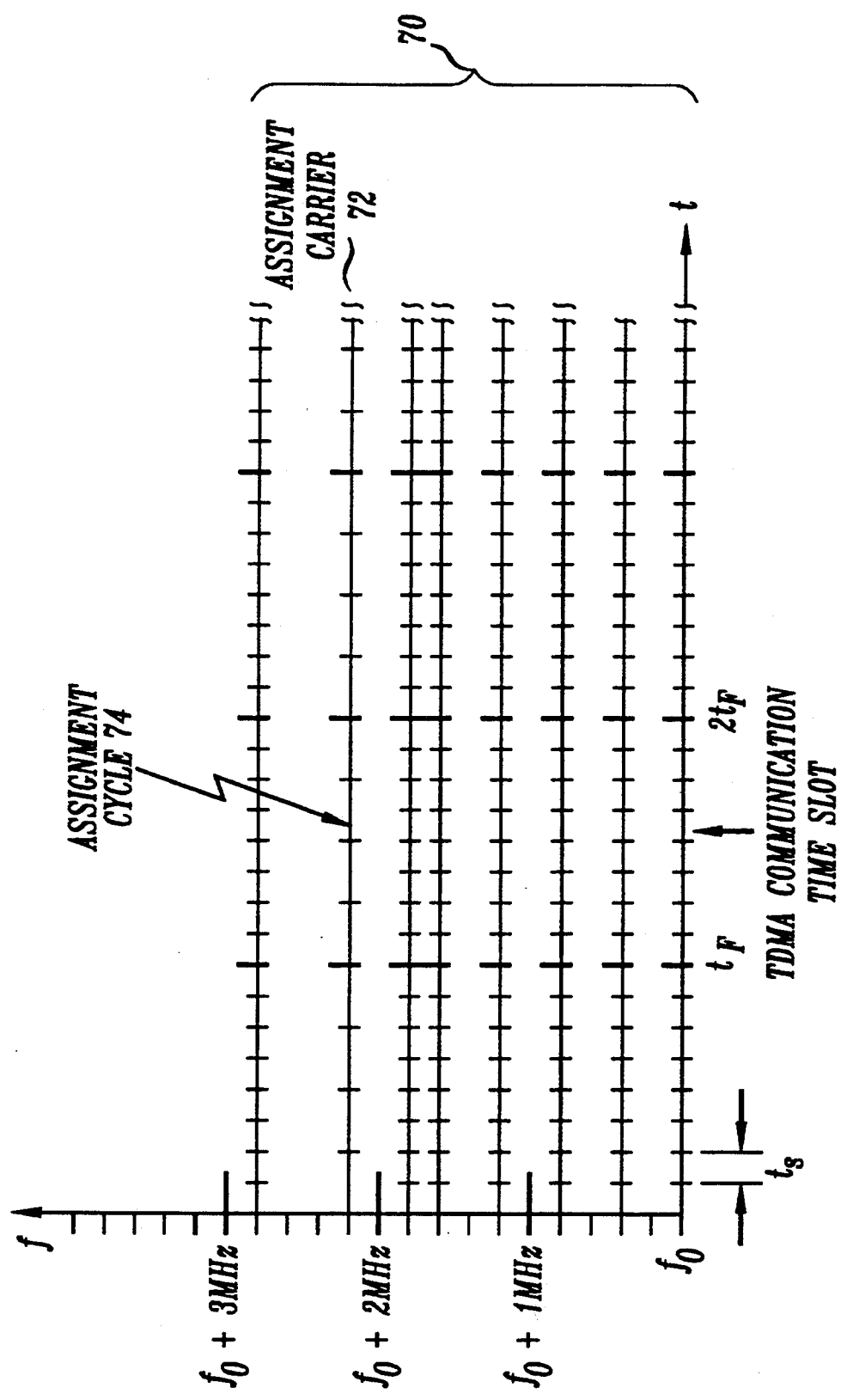
FIG. 4 illustrates the incorporation of this invention into a cellular telecommunications network having communications resources in the form of a plurality of time slots on a plurality of carrier frequencies.

FIG. 4 shows an example of an arrangement of communications resources on a cellular network in accordance with the architectures of FIGS. 1 and 2 which uses the communications resource assignment procedure depicted in FIG. 3. Other arrangements of carriers and/or time slots within the allotted frequency spectrum are also possible. The communications resources comprise a number of carrier frequencies 70. Cellular subscribers may communicate with cannisters in the cellular network and their associated base stations by appropriate modulation of one of the carrier frequencies which has been assigned to the subscriber. This modulation of the assigned carrier occurs in one or more assigned time slots of duration $T_s$. A portion of the communication resources available to each cannister is assigned to carry out the auction procedure undertaken in response to requests for assignment of communications resources from cellular subscribers. In FIG. 4, that portion of the communications resources assigned to carry out the auction procedure comprises one assignment carrier frequency 72 on which assignment cycle time periods 74 are defined. The transmission of identification codes of contending subscribers to the cannisters, the responses from the cannisters to the subscribers in response to the transmission of identification codes, and the notification by the cannister of the resource assignment made to the subscriber by the base station occur by suitable modulation of the assignment carrier frequency by the contending subscribers and by the base station and cannister. For example, the modulation of the assignment carrier 72 can be accomplished by M-ary frequency shift keying (FSK) modulation. Other types of modulation, such as CDMA, may also be used. CDMA may be used to spread, over a substantial portion of the bandwidth allocated to the cellular telecommunications network, the signal powers produced in the course of performing the highest level priority subscriber identification and the resource assignment to that subscriber. Identification and assignment signals between subscribers and base stations does not cause serious interference with call traffic between subscribers and base stations in this situation. There thus is no longer a need for a dedicated assignment carrier. All carriers may be used for call traffic in this CDMA arrangement.

Computational Examples

Application of the communications resource assignment procedure to an environment like the European GSM cellular telecommunications network is demonstrated by the computational examples set forth below. As those skilled in the art will appreciate, the GSM telecommunications network is a combination of time division multiple access (TDMA) superimposed on a number of frequency division multiple access (FDMA) carriers like the arrangement depicted schematically in FIG. 4. Some of the pertinent GSM parameters are as follows:

1. The separation between carriers is 200 kHz;
2. There are eight TDMA time slots for each carrier;
3. The duration of a time slot $T_s = 576.9$ microseconds; and
4. A frame comprises 8 time slots, the duration of a frame being $8 \times 576.9$ microseconds $= 4.615$ milliseconds.

Typically, in an arrangement such as one of those shown in FIGS. 1, 2, or 4, each microcell has allocated to it a certain number of the available carrier frequencies with eight time slots per carrier as indicated above. As described above, one of the carriers is set aside and used as the resource assignment or access carrier. The identification of this carrier is transmitted by each cannister along with the identification of each cannister as discussed above. The same basic frame duration $t_f = 4.615$ milliseconds may be maintained for the assignment carrier. Each frame is divided into a certain number of assignment cycles shown in FIG. 3. The duration of each assignment cycle may or may not be the same as the duration of a timeslot $T_s$ on the other carriers. Available communications resources, that is, combinations of frequencies and timeslots, are assigned in one frame of the assignment carrier for use by the cellular subscribers in the following frame.

The purpose of this example is to estimate how many carrier frequency time slot combinations L can be assigned during one frame duration $t_F$. Transmissions on the assignment carrier are assumed to be carded out using M-ary FSK. CDMA and other methods could also be used.

For M-ary FSK with signal bandwidth BW, the symbol duration $T_s$ is approximately:

$$T_s = M/2BW. \tag{1}$$

Every symbol transmitted and acknowledged including the propagation delay $t_d$ will require:

$$t_b = 2 \times (t_d + T_s). \tag{2}$$

A ten-digit decimal requires $K_M$ M-ary digits, while a four-digit decimal (for slot assignment) requires $N_m$ M-ary digits. The total time required for a carrier time slot assignment is, therefore, $$t_{tot} = (K_M \times t_b) + (N_M \times t_b/2). \tag{3}$$

In a frame of duration $t_F$, L slots/carrier could be assigned, where:

$$L = t_F/t_{tot}. \tag{4}$$

Values of L have been calculated for various values of M and $t_d$ using the equations specified above. The results are shown in Tables I to IV below.

L has been calculated for various values of M and $t_d$, using equations (1) to (4). Table I lists the number of handoffs/assignments per frame for propagation delays of up to 25 $\mu$sec and M values ranging from 2 to 16. For very short propagation delays, up to 10 assignments per 4.615 msec can be made. However, as the propagation delay increases, so does the overhead, causing a reduction in the number of assignments. As can be seen, for $t_d = 25$ $\mu$sec, three assignments can be made per 4.615 msec. In cases where the fractional pan of the number of assignments is greater than 0.5, we can gain an additional assignment by extending the assignment cycle to $2t_F = 9.23$ msec. This is displayed in Table II. Quaternary FSK (M=4) seems close to the optimum value of M over a broad range of value of $t_d$. Due to the logarithmic relationship between M and the number of digits needed to represent the subscriber ID, the octal and hexadecimal values (M=8 and 16) are not as efficient as quaternary FSK.

Using the integer values of the numbers listed in Tables I and II, the number of assignments per second for assignment cycles of $t_F$ and $2t_F$, (Tables III and IV, respectively) have been calculated. As can be seen, over 600 fast assignments per second are feasible with a propagation delay of 25 $\mu$sec.

Figure 5:
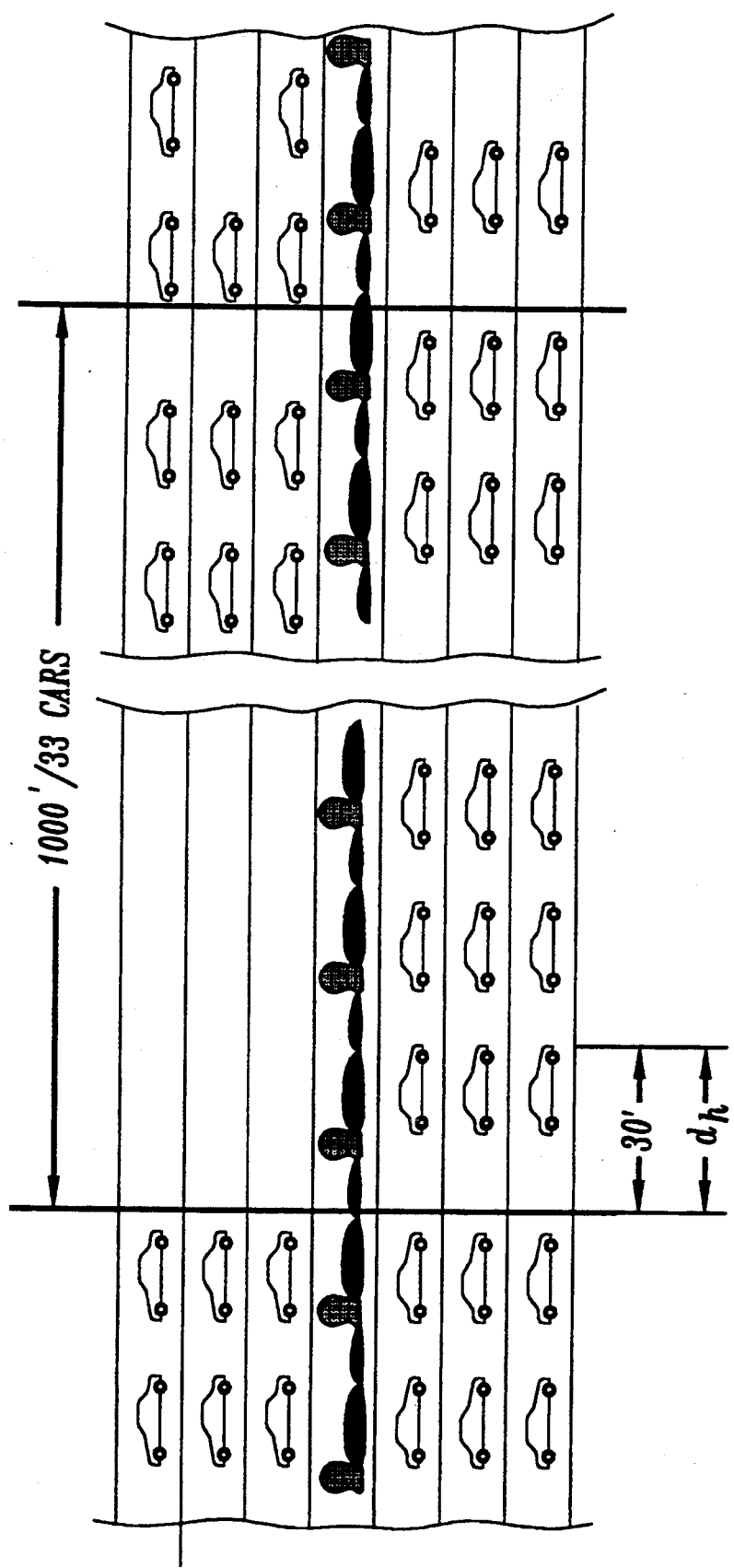
FIG. 5 illustrates an example of a microcell in accordance with this invention which serves a six-lane highway carrying densely spaced cellular subscribers contending for communications resources.

In order to gain a feel for what these numbers mean in realistic situations, consider a 1000-foot microcell serving a section of the 6-lane highway depicted in FIG. 5. Assume a pessimistic situation where 33 vehicles per lane are traveling at 60 mph (88 feet per second). Each vehicle is located in roughly a 30-foot segment of road, $d_h$, consisting of the vehicle length and the inter-vehicular spacing. A maximum number of six vehicles can cross into this microcell simultaneously, requiring 6 resource assignments for handoff. A reasonable assumption is that the maximum time allowed for handoff is the time required to traverse $d_h$. This time is 341 msec. for vehicles traveling at 60 mph. With $t_d = 25$ $\mu$sec, we can satisfy this requirement in less than 10 msec. The rest of the assignment capacity could be, therefore, utilized for speech activity controlled resource sharing and other communications support activities.

Note that $t_d = 25$ $\mu$sec. corresponds to approximately 4.7 miles of propagation delay. In urban lineal microcells 1000 to 2000 feet long, propagation delays would be far less than 25 $\mu$sec. This suggests that a much higher number of handoffs and assignments are possible.

Conclusion

A novel approach has been presented to address the need for fast and flexible access, handoff, and resource assignment in present and future wireless personal communications systems. One deterministic procedure produces a fast handoff, access, and resource assignment which is independent of traffic load.

There will be a variety of service offerings in present and future personal communications systems which can be accommodated by using this invention. The bulk of such services may be directed towards stationary subscribers. Even within this group, one could offer various grades of service, for example, a highly reliable service with high quality for residential or business subscribers. Contrast this with a lower-cost service offered for short calls where a call could be dropped and its resource re-assigned to a higher grade-of-service during high traffic demand. Vehicular access would entail a higher grade-of-service since handoffs would be needed. Similarly, speech activity controlled resource sharing would entail a higher-grade-of service since faster access and resource assignments would be needed. From the above discussion, it is clear that priorities would have to be assigned to the subscribers and appended to their ID, based upon the grade-of-service they subscribe to for a different classes of calls, different time periods and the like.

One set of computational examples demonstrates a realization of the assignment/handoff apparatus and procedure using the parameters of the European GSM system. In small microcells with low propagation delays (up to 1 $\mu$sec.), 10 resource assignments per 4.615 msec. (or equivalently 2160 assignments per second) can be attained, using quaternary FSK for communicating between the subscriber, cannister, and base station on the assignment carrier frequency. For larger cells with higher propagation delays of up to 25 $\mu$sec., one can still have 3 resource assignments per 4.615 msec. (or equivalently 648 assignments per second).

TABLE I

HAND-OFFS/ASSIGNMENTS PER $t_F$ = 4.615 msec.

| PROPAG. DELAY ($\mu$sec) | M = 2 | M = 3 | M = 4 | M = 8 | M = 16 |
|---|---|---|---|---|---|
| 1 | 9.4 | 10.6 | 10.2 | 7.8 | 5.1 |
| 5 | 5.6 | 7.2 | 7.5 | 6.6 | 4.7 |
| 10 | 3.8 | 5.2 | 5.6 | 5.5 | 4.2 |
| 15 | 2.8 | 4.0 | 4.5 | 4.7 | 3.8 |
| 20 | 2.3 | 3.3 | 3.8 | 4.1 | 3.5 |
| 25 | 1.9 | 2.8 | 3.2 | 3.7 | 3.2 |

TABLE II

HAND-OFFS/ASSIGNMENTS PER $2t_F$ = 9.23 msec.

| PROPAG. DELAY ($\mu$sec) | M = 2 | M = 3 | M = 4 | M = 8 | M = 16 |
|---|---|---|---|---|---|
| 1 | 18.8 | 21.3 | 20.5 | 15.7 | 10.2 |
| 5 | 11.3 | 14.5 | 15.0 | 13.2 | 9.3 |
| 10 | 7.5 | 10.3 | 11.2 | 10.9 | 8.4 |
| 15 | 5.6 | 8.0 | 9.0 | 9.4 | 7.6 |
| 20 | 4.5 | 6.6 | 7.5 | 8.2 | 6.9 |
| 25 | 3.7 | 5.6 | 6.4 | 7.3 | 6.4 |

TABLE III

HAND-OFFS/ASSIGNMENTS PER SECOND ($t_F$ ASSIGNMENT CYCLE)

| PROPAG. DELAY ($\mu$sec) | M = 2 | M = 3 | M = 4 | M = 8 | M = 16 |
|---|---|---|---|---|---|
| 1 | 1,944 | 2,160 | 2,160 | 1,152 | 1,080 |
| 5 | 1,080 | 1,512 | 1,512 | 1,296 | 864 |
| 10 | 648 | 1,080 | 1,080 | 1,080 | 864 |
| 15 | 432 | 864 | 864 | 864 | 648 |
| 20 | 432 | 648 | 648 | 864 | 648 |
| 25 | 216 | 432 | 648 | 648 | 648 |

TABLE IV

HAND-OFFS/ASSIGNMENTS PER SECOND ($2t_F$ ASSIGNMENT CYCLE)

| PROPAG. DELAY ($\mu$sec) | M = 2 | M = 3 | M = 4 | M = 8 | M = 16 |
|---|---|---|---|---|---|
| 1 | 1,944 | 2,268 | 2,160 | 1,620 | 1,080 |
| 5 | 1,188 | 1,512 | 1,620 | 1,404 | 972 |
| 10 | 756 | 1,080 | 1,188 | 1,080 | 864 |
| 15 | 540 | 864 | 972 | 972 | 756 |
| 20 | 432 | 648 | 756 | 864 | 648 |
| 25 | 324 | 540 | 648 | 756 | 648 |

I claim:

1. An apparatus for assigning one of a plurality of wireless communications channels in a wireless telecommunications system to a requesting subscriber, comprising:
   a means for identifying a highest level priority colliding subscriber out of a plurality of prioritized colliding subscribers simultaneously contending over a single wireless contention channel for access to a wireless communications channel between the plurality of prioritized colliding subscribers and a wireless telecommunications system, the wireless contention channel being different from the wireless communications channel; and
   a means for assigning an unused one of a plurality of wireless communications channels between the colliding subscribers and the wireless telecommunications system to an identified highest level priority colliding subscriber.

2. The apparatus of claim 1, in which the identifying means comprises a means responsive to a modulated assignment carrier frequency for performing an auction procedure with respect to one or more contending subscribers which determines the highest level priority subscriber.

3. The apparatus of claim 2, in which the identifying means further comprises a means for repeating the auction procedure for subscribers remaining after identification of the highest level priority subscriber.

4. The apparatus of claim 2, in which the modulated assignment carrier frequency has an M-ary frequency shift keying modulation.

5. The apparatus of claim 4, in which the frequency shift keying modulation is quaternary frequency shift keying modulation.

6. The apparatus of claim 2, in which the assignment carrier has CDMA modulation.

7. The apparatus of claim 2, in which the assigning means assigns a wireless communications channel to a subscriber having a highest level priority in response to completion of the auction procedure.

8. The apparatus of claim 1, in which the identifying means is responsive to a multidigit code comprising a predetermined number of digits uniquely identifying each subscriber and a priority code identifying a level of priority associated with each subscriber.

9. The apparatus of claim 8, in which the identifying means is responsive to most significant digits of the priority codes of a plurality of contending subscribers for determining which of the most significant digits is highest.

10. The apparatus of claim 9, in which the identifying means further comprises a means for notifying the contending subscribers of a magnitude of the highest most significant digit of the contending subscribers and inhibiting further communication between the identifying means and those contending subscribers having most significant digits with a magnitude less than the highest magnitude.

11. The apparatus of claim 10, in which the identifying means repeats the auction procedure for next most significant digits of the contending subscribers which had the highest magnitude most significant digits until only one contending subscriber having a highest magnitude priority code remains.

12. The apparatus of claim 11, in which the assigning means is responsive to identification of the contending subscriber with the highest magnitude priority code and assigns a wireless communications channel to that subscriber.

13. The apparatus of claim 12, in which the assigning means transmits to the subscriber having the highest magnitude priority code a multidigit code representing an identity of a wireless communications channel which is to be used by that subscriber to communicate with the wireless telecommunications system.

14. The apparatus of claim 13, in which the identifying means comprises a means for repeating the procedure for identifying a contending subscriber with the highest magnitude priority code in response to assignment of a wireless communications channel by the assigning means.

15. The apparatus of claim 14, in which the assigning means assigns another wireless communications channel to a subscriber having a highest magnitude priority code of remaining contending subscribers.

16. The apparatus of claim 1, in which the wireless communications channel is a time slot on one of a plurality of carrier frequencies.

17. The apparatus of claim 1, in which the wireless communications channel is a CDMA sequence.

18. The apparatus of claim 1, in which the wireless communications channels are between the plurality of contending subscribers and a single base station in the wireless telecommunications system.

19. A method of assigning one of a plurality of communications resources in a wireless telecommunications system to a requesting subscriber, comprising the steps of:
identifying a highest level priority colliding subscriber out of a plurality of prioritized colliding subscribers simultaneously contending over a single wireless contention channel for access to a single wireless communications channel between the plurality of prioritized subscribers and a wireless telecommunications system, the wireless contention channel being different from the wireless communications channel; and
assigning an unused one of a plurality of wireless communications channels between the colliding subscribers and the wireless telecommunications system to an identified highest level priority colliding subscriber.

20. The method of claim 19, in which the identifying step comprises the step of receiving a modulated assignment carrier frequency and performing an auction procedure with respect to one or more contending subscribers which determines the highest priority subscriber.

21. The method of claim 20, further comprising the step of repeating the auction procedure for subscribers remaining after identification of the highest priority subscriber.

22. The method of claim 19, further comprising the step of notifying the identified subscriber of an assigned wireless communications channel.

23. The apparatus of claim 19, in which the wireless communications channels are between the plurality of contending subscribers and a single base station in the wireless telecommunications system.

24. An apparatus for assigning a wireless communications channel in a wireless telecommunications system to a requesting user, comprising:
a means for identifying a highest level priority colliding user out of a plurality of prioritized colliding users simultaneously contending over a single wireless contention channel for access to a wireless communications channel between the plurality of prioritized colliding users and a wireless telecommunications system, the wireless contention channel being different from the wireless communications channel; and
a means for assigning a wireless communications channel between the colliding users and the wireless telecommunications system to an identified highest level priority colliding user.

* * * * *